United States Patent [19]
Tanaka et al.

[11] Patent Number: 5,766,431
[45] Date of Patent: Jun. 16, 1998

[54] ELECTROLYZER

[75] Inventors: Tokuo Tanaka; Masao Sanuki, both of Toyoake, Japan

[73] Assignee: Hosizaki Denki Kabushiki Kaisha, Aichi-Ken, Japan

[21] Appl. No.: 685,838

[22] Filed: Jul. 24, 1996

[51] Int. Cl.$^6$ .................. C25B 9/00; C25B 15/08
[52] U.S. Cl. ........................... 204/263; 204/282
[58] Field of Search .................. 204/256–258, 204/263–266, 282

[56] References Cited

U.S. PATENT DOCUMENTS

| | | | |
|---|---|---|---|
| 4,029,565 | 6/1977 | Bender et al. | 204/256 |
| 4,297,194 | 10/1981 | Dotson et al. | 204/263 X |
| 4,420,387 | 12/1983 | Bergner et al. | 204/263 |
| 5,158,658 | 10/1992 | Cawlfield et al. | 204/263 X |

FOREIGN PATENT DOCUMENTS 55-35906  3/1980  Japan.
4-330987  11/1992  Japan.

*Primary Examiner*—Donald R. Valentine
*Attorney, Agent, or Firm*—Nikaido, Marmelstein, Murray & Oram LLP

[57] ABSTRACT

An electrolyzer including an upright casing having a lower portion formed with a pair of opposed inlet ports and an upper portion formed with a pair of opposed outlet ports, an ion permeable diaphragm mounted within the casing to subdivide the interior of the casing into a pair of reaction chambers respectively in open communication with the inlet and outlet ports, a pair of electrode plates respectively disposed within the reaction chambers and opposed to one another through the diaphragm for electrolyzing water flowing therethrough from the inlet ports to the outlet ports when being applied with electric current, wherein the electrode plates are attached to internal surfaces of the casing to cover each inner end of the inlet ports and to form a pair of bifurcated passages respectively in open communication with the inlet ports, and wherein a pair of inlet chambers are formed along each lower edge of the electrode plates and communicated with the inlet ports through the bifurcated passages.

8 Claims, 8 Drawing Sheets

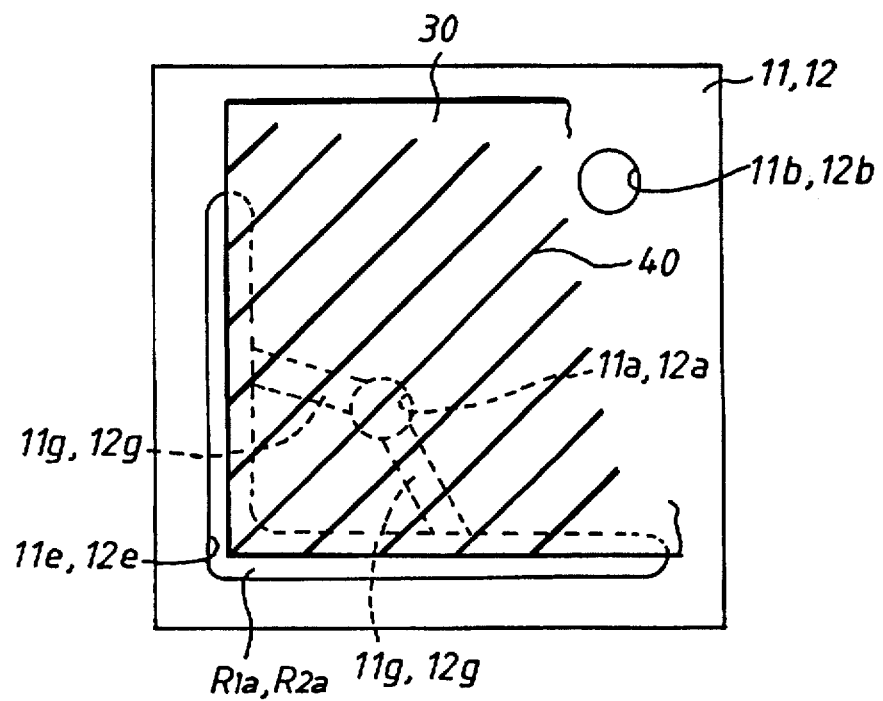

ELECTROLYZER

BACKGROUND OF THE INVENTION

1. Field of the Invention

The present invention relates to an electrolyzer for electrolytic treatment of water to be treated.

2. Description of the Prior Art

Disclosed in Japanese Patent Laid-open Publication No. 4(1992)-330987 is an electrolyzer which includes an upright casing formed with a pair of inlet ports at its lower portion and a pair of outlet ports at its upper portion, an ion-permeable diaphragm mounted within the casing to subdivide the interior of the casing into a pair of reaction chambers respectively in open communication with the inlet and outlet ports and a pair of electrode plates disposed within the respective reaction chambers and opposed to one another through the diaphragm for electrolyzing water flowing from the inlet ports to the outlet ports therethrough when being applied with electric current. Disclosed also in Japanese Patent Laid-open Publication No. 55(1980)-35906 is an electrolyzer of this type in which a rectangular electrode plate is adapted as the electrode plate.

In the electrolyzer, water to be treated linearly flows from the inlet ports to the outlet ports since it does not uniformly flow in the reaction chambers. As a result, the water may not be electrolyzed at the entire surfaces of the opposed electrode plates, and bubbles of gases generated by electrolyzation of the water adheres to the electrode plates at a place where the water does not flow. For these reasons, the efficiency of electrolyzation becomes lower.

SUMMARY OF THE INVENTION

It is, therefore, a primary object of the present invention to provide an electrolyzer capable of electrolyzing the water at high efficiency.

According to the present invention, the object is accomplished by providing an electrolyzer which includes an upright casing made of an insulation resin material, the casing having a lower portion formed with a pair of opposed inlet ports and an upper portion formed with a pair of opposed outlet ports, an ion permeable diaphragm mounted within the casing to subdivide the interior of the casing into a pair of reaction chambers respectively in open communication with the inlet and outlet ports, a pair of electrode plates respectively disposed within the reaction chambers and opposed to one another through the diaphragm for electrolyzing water flowing therethrough from the inlet ports to the outlet ports when being applied with electric current, wherein the electrode plates are attached to internal surfaces of the casing to cover each inner end of the inlet ports and to form a pair of bifurcated passages respectively in open communication with the inlet ports, and wherein a pair of inlet chambers are formed along each lower edge of the electrode plates and communicated with the inlet ports through the bifurcated passages.

According to an aspect of the present invention, there is provided an electrolyzer which includes an upright casing having a lower portion formed with a pair of opposed inlet ports and an upper portion formed with a pair of opposed outlet ports, an ion permeable diaphragm mounted within the casing to subdivide the interior of the casing into a pair of reaction chambers respectively in open communication with the inlet and outlet ports, a pair of electrode plates respectively disposed within the reaction chambers and opposed to one another through the diaphragm for electrolyzing water flowing therethrough from the inlet ports to the outlet ports when being applied with electric current, wherein a pair of inlet chambers respectively in open communication with the inlet ports are formed along each lower edge of the electrode plates, and wherein a pair of outlet chambers respectively in open communication with the outlet ports are formed along each upper edge of the electrode plates.

According to another aspect of the present invention, there is provided an electrolyzer which includes an upright casing having a lower portion formed with a pair of opposed inlet ports and an upper portion formed with a pair of opposed outlet ports, an ion permeable diaphragm mounted within the casing to subdivide the interior of the casing into a pair of reaction chambers respectively in open communication with the inlet and outlet ports, a pair of electrode plates respectively disposed within the reaction chambers and opposed to one another through the diaphragm for electrolyzing water flowing therethrough from the inlet ports to the outlet ports when being applied with electric current, wherein the casing is composed of a pair of casing plates united at their outer peripheries through the diaphragm in a liquid-tight manner in such a manner that the diaphragm is applied with a predetermined tension.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 8 is a schematic illustration of a modification of the electrolyzer shown in FIG. 1.

DESCRIPTION OF THE PREFERRED EMBODIMENTS

Figure 1:
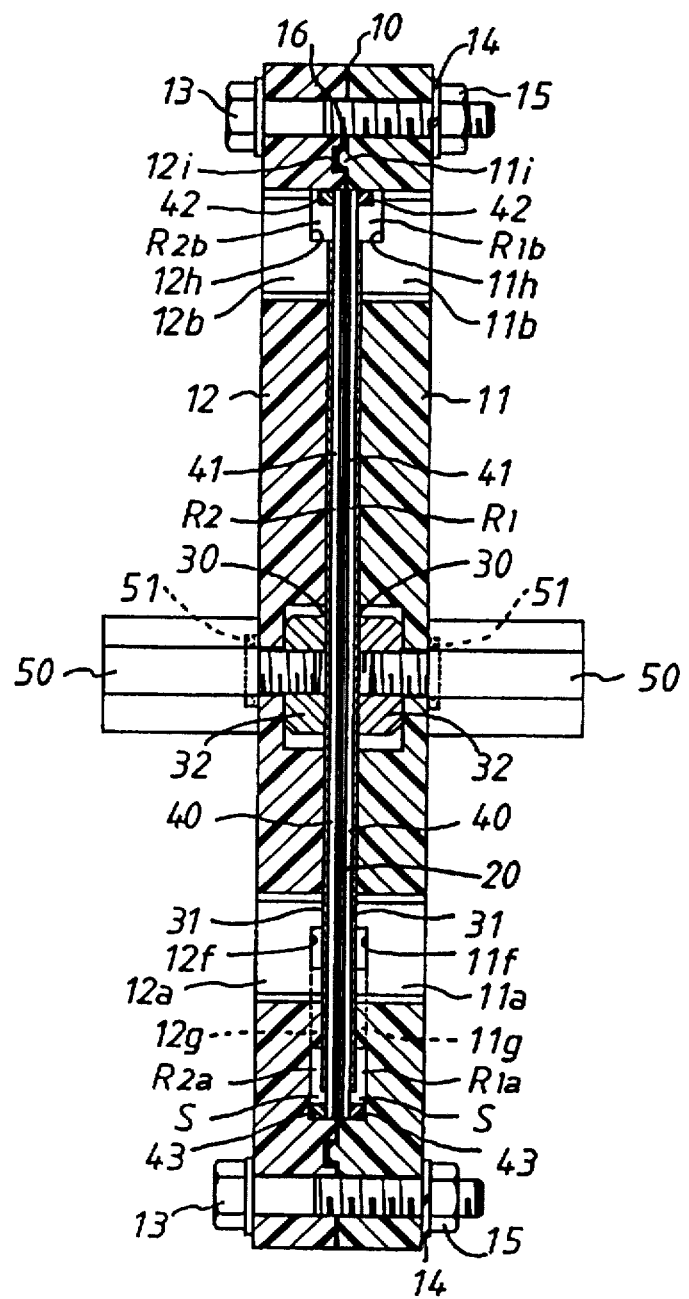
FIG. 1 is a vertical sectional view of an embodiment of an electrolyzer in accordance with the present invention.
Figure 2:
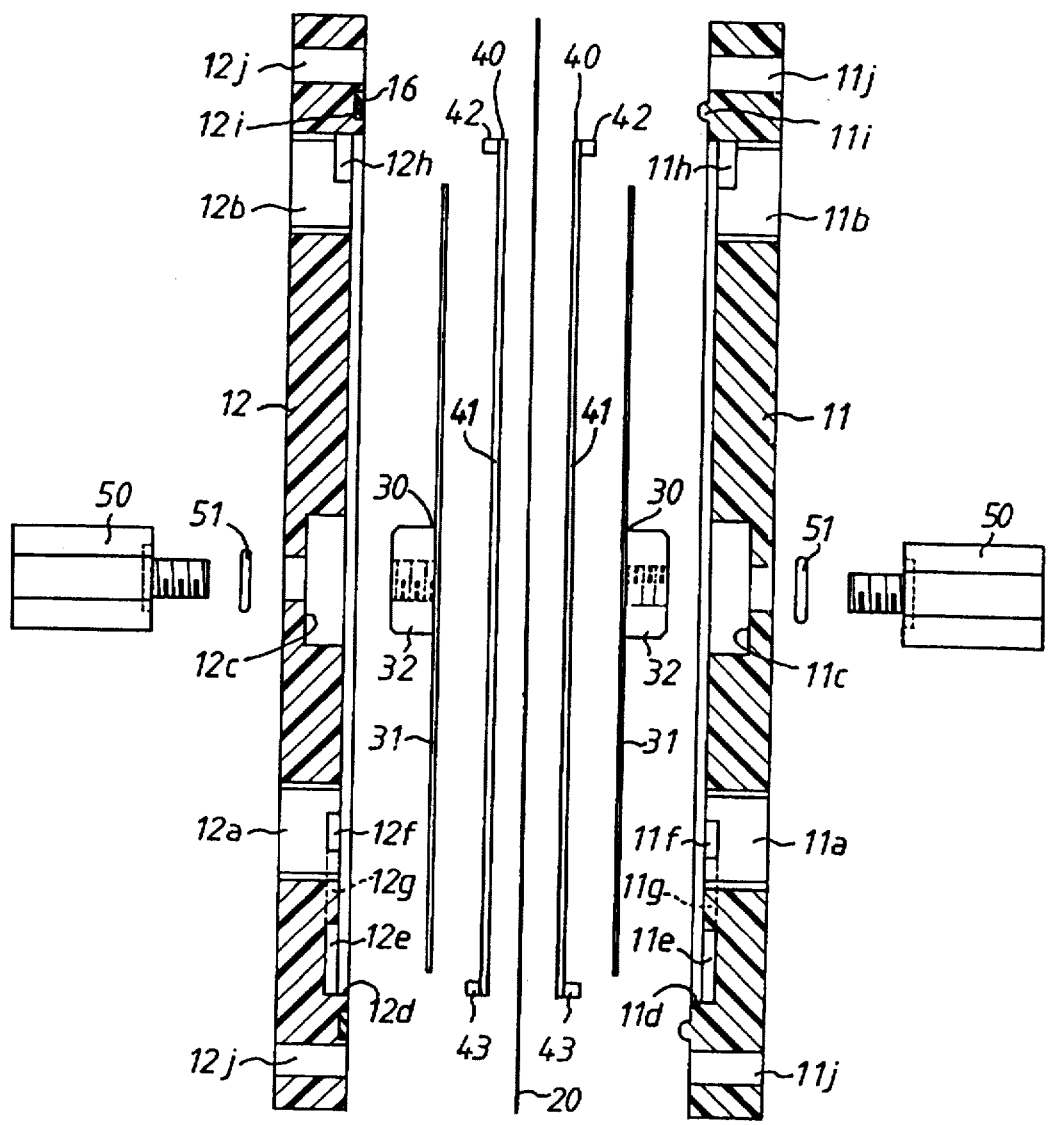
FIG. 2 illustrates a dissembled condition of the electrolyzer shown in FIG. 1.

Illustrated in FIGS. 1 and 2 is an electrolyzer in accordance with the present invention which includes an upright easing assembly 10 formed with a pair of opposed inlet ports 11a, 12a at its lower portion and a pair of opposed outlet ports 11b, 12b at its upper portion, an ion permeable diaphragm 20 disposed within the casing assembly 10 to subdivide the interior of the casing assembly 10 into a pair of reaction chambers R1, R2 respectively in open communication with the inlet ports 11a, 12a and outlet ports 11b, 12b, a pair of opposed rectangular electrode plates 30, 30 placed in the reaction chambers R1, R2, and a pair of guide assemblies 40, 40 disposed between the diaphragm 20 and the opposed electrode plates 30.

Figure 3:
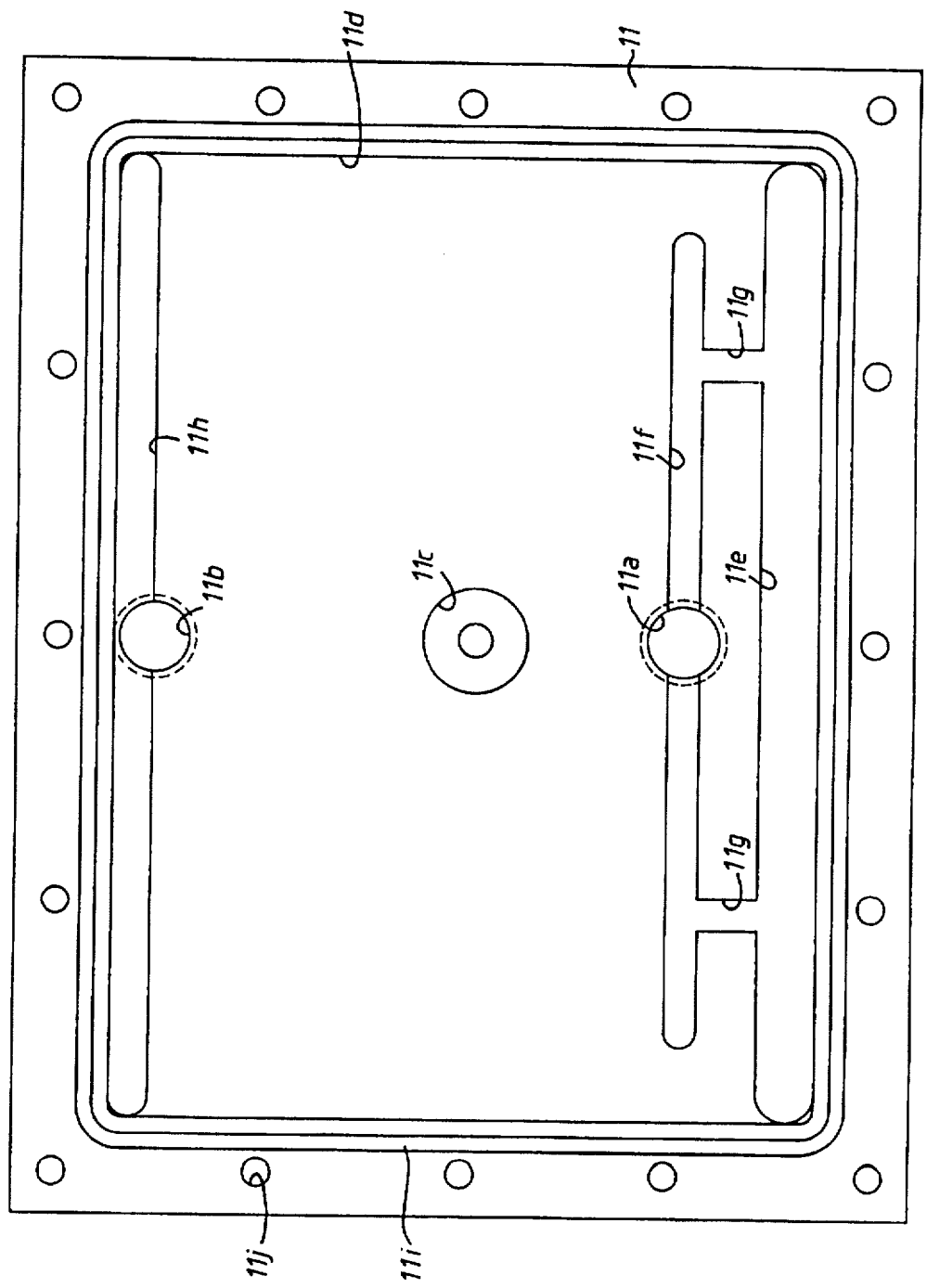
FIG. 3 is an elevational view of a right-hand casing plate shown in FIG. 1.
Figure 4:
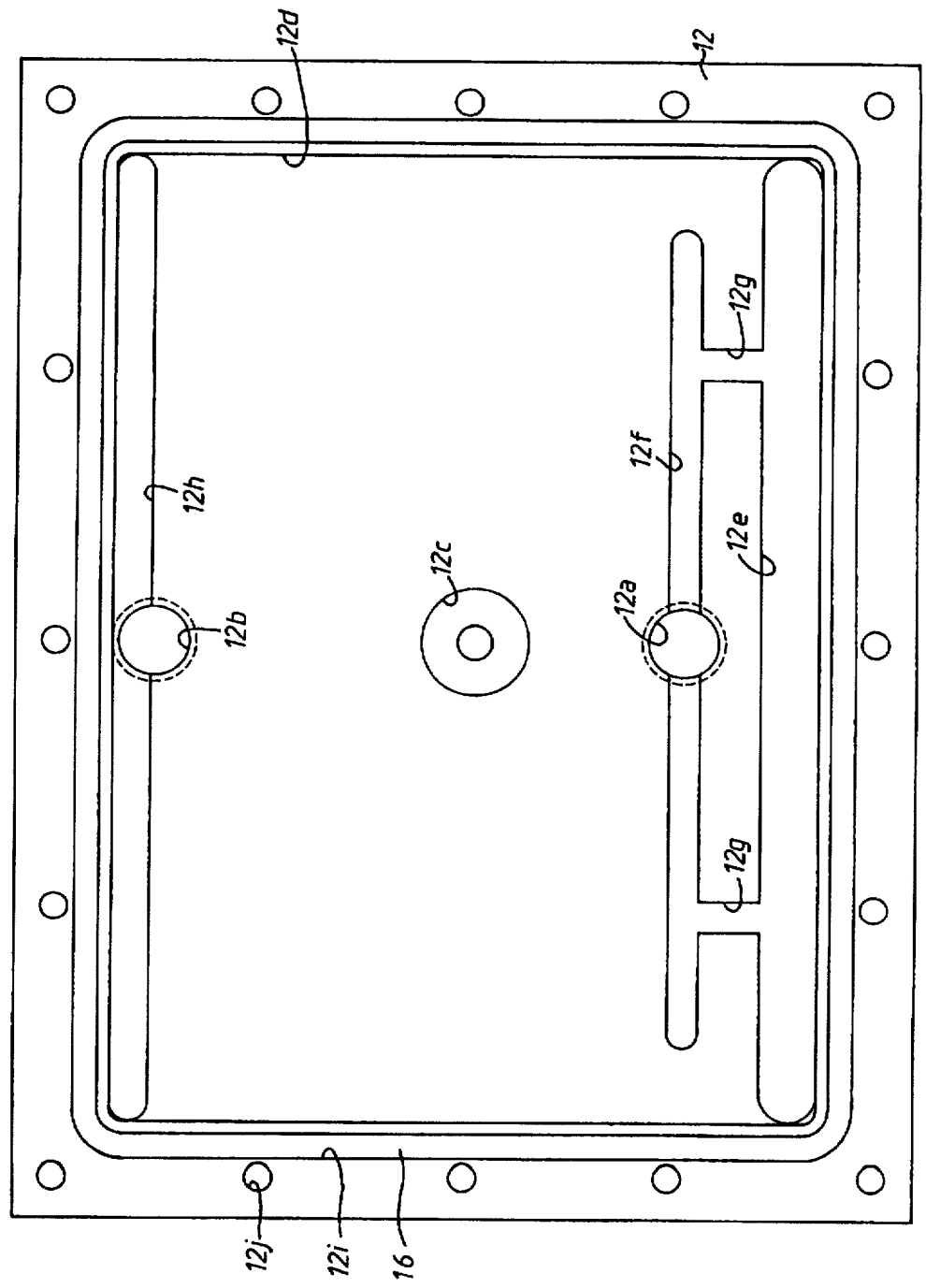
FIG. 4 is an elevational view of a left-hand casing plate shown in FIG. 1.

The casing assembly 10 is composed of a pair of casing plates 11 and 12 made of an insulation resin material. The casing plates 11 and 12 each are rectangular as shown in FIGS. 3 and 4, and joined at their outer peripheries by bolts 13 and nuts 15 through spring washers 14. As shown in FIGS. 2 and 3, the right-hand casing plate 11 is formed with the inlet and outlet ports 11a and 11b at upper and lower portions thereof and is formed with a stepped hole 11c at its central portion. The right-hand casing plate 11 is formed with a rectangular internal recess 11d which is formed at a lower side thereof with a lower horizontal groove 11e of wide width and an upper horizontal groove 11f of narrow width. The upper horizontal groove 11f is communicated at a central portion thereof with the inlet port 11a and communicated at both sides thereof with the lower horizontal groove 11e through a pair of vertical grooves 11g. The rectangular recess 11d is further formed at the upper edge thereof with a horizontal groove 11h which is communicated with the outlet port 11b at the central portion thereof. The right-hand casing plate 11 is further formed with a rectangular projection 11i of semi-circular cross-section along the outer periphery of rectangular recess 11, while the left-hand casing plate 12 is formed with a rectangular groove 12i for engagement with the rectangular projection 11i of casing plate 11. The rectangular groove 12i is filled with a rectangular elastic sealing member 16.

Similarly to the right-hand casing plate 11, as shown in FIGS. 2 and 4, the left-hand casing plate 12 is formed with the inlet and outlet ports 12a and 12b and formed with a stepped hole 12c. The casing plate 12 is formed with a rectangular internal recess 12d which is formed at the lower side thereof with a lower horizontal groove 12e of wide width and an upper horizontal groove 12f of narrow width. The upper horizontal groove 12f is communicated at the central portion thereof with the inlet port 12a and communicated at its both sides with the lower horizontal groove 12e through a pair of vertical grooves 12g. The casing plate 12 is further formed with at the upper edge thereof with a horizontal groove 12h which is communicated with the outlet port 12b at the central portion thereof. In addition, the casing plates 11 and 12 are formed at their outer peripheries with bolt insertion holes 11j, 12j, respectively.

Figure 5:
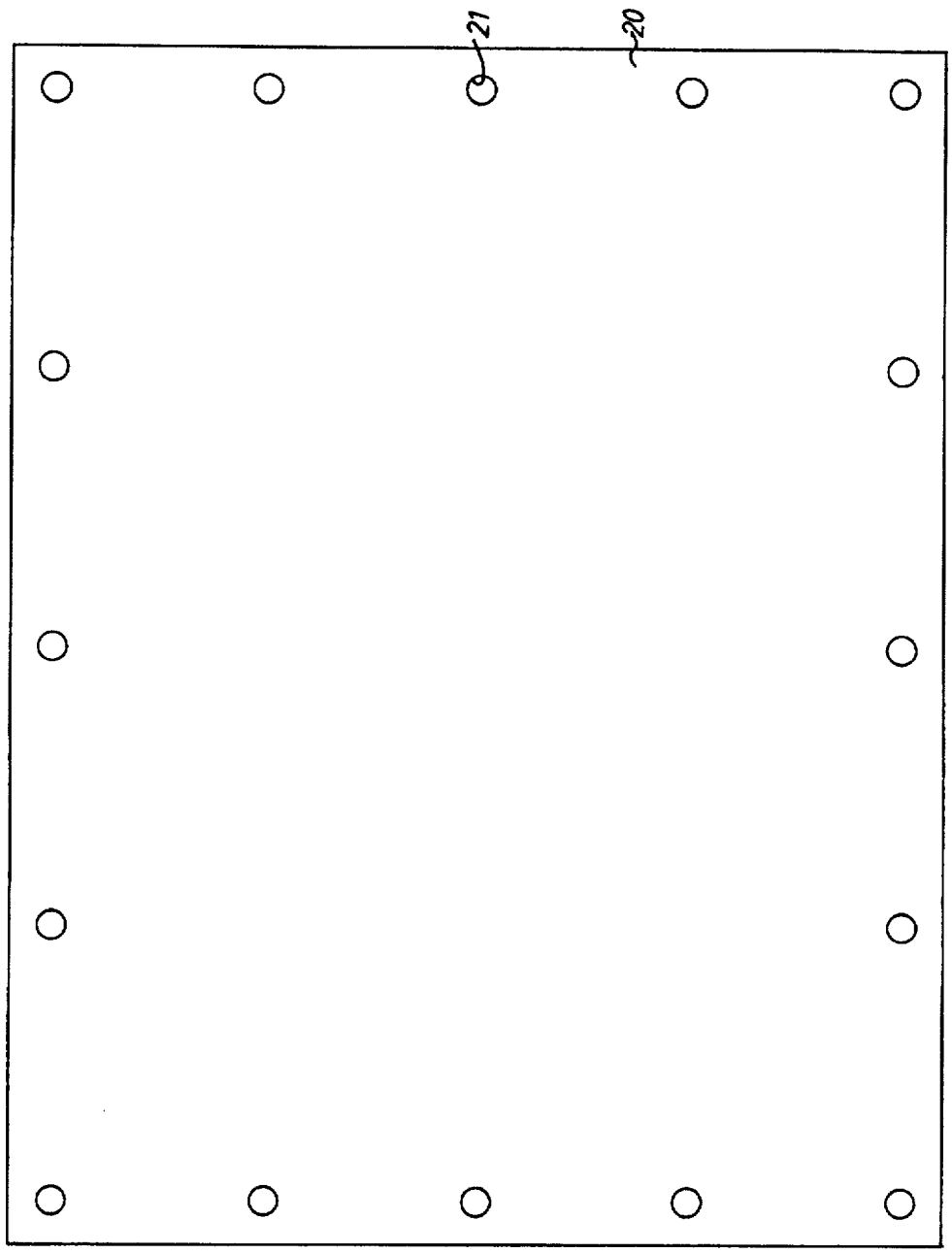
FIG. 5 is an elevational view of an ion permeable diaphragm shown in FIG. 1.

The ion permeable diaphragm 20 is in the form of a microporous thin membrane of 0.12 mm in thickness which is made of a non-woven polyester cloth. As shown in FIG. 5, the thin membrane 20 is cut out in the same size as the casing plates 11, 12 and formed with bolt insertion holes 21 corresponding with the bolt insertion holes 11j, 12j of casing plates 11, 12. In a condition where the thin membrane 20 has been placed within the casing assembly 10, the membrane is pulled outwardly by engagement of the rectangular projection 11i of casing plate 11 with the corresponding groove 12i of casing plate 12 and applied with a predetermined tension.

Figure 6:
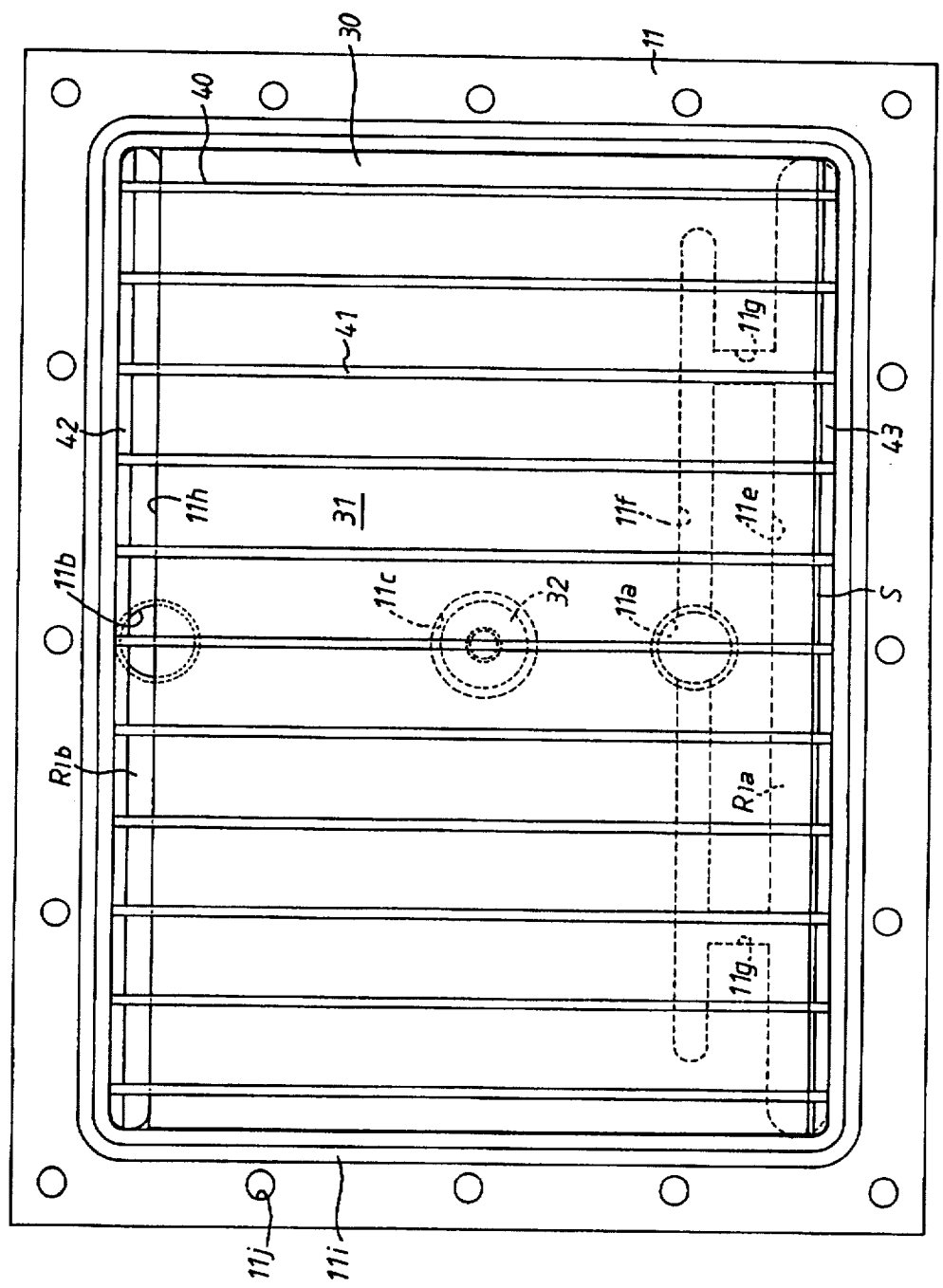
FIG. 6 is an elevational view of an electrode plate and a guide assembly mounted to the right-hand casing plate shown in FIG. 3.
Figure 7:
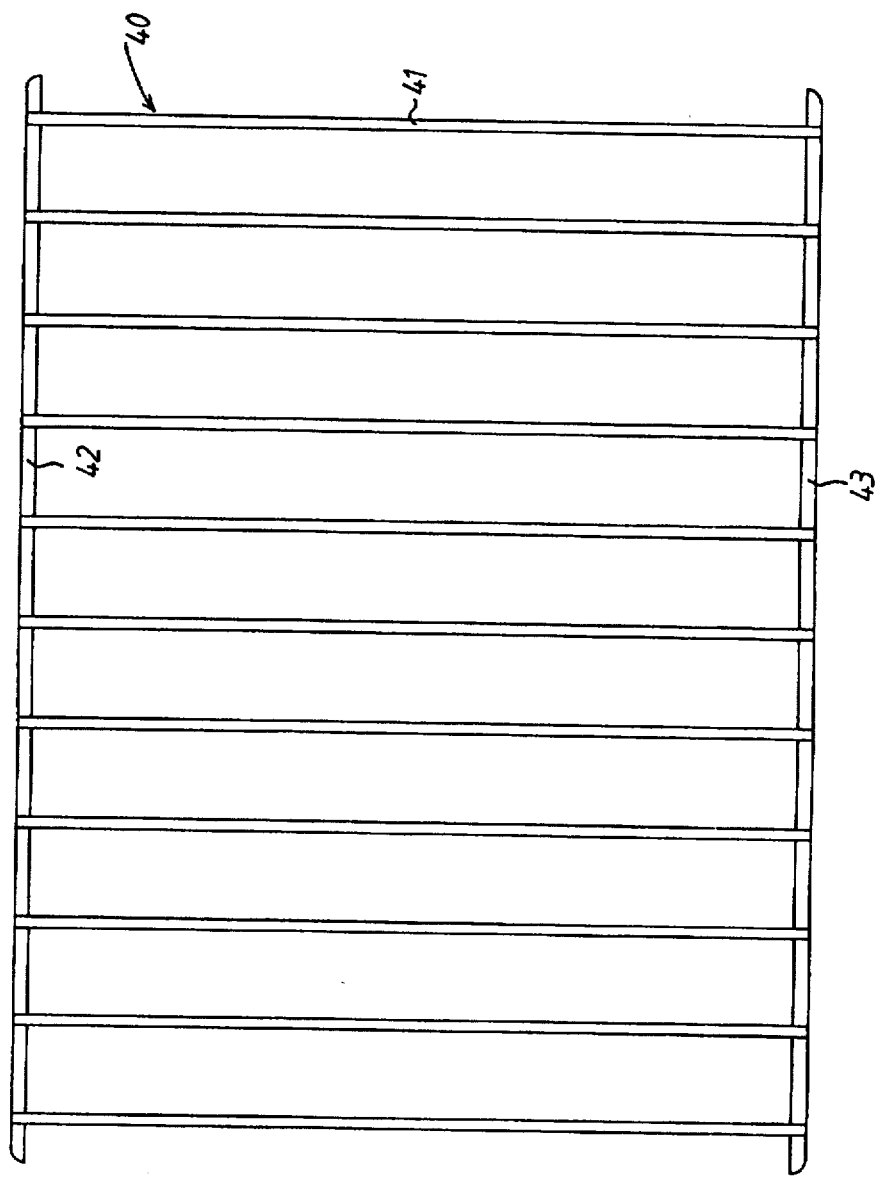
FIG. 7 is an elevational view of the guide assembly itself.

As shown in FIGS. 1, 2 and 6, the electrode plates 30 each is in the form of a rectangular electrode plate 31 provided with a nut 32 welded thereto. The electrode plates 30 are coupled within the rectangular recesses 11d, 12d of casing plates 11, 12 and secured to the casing plates 11, 12 by means of electrode terminal bolts 50 respectively threaded into the nut 32 through an O-ring 51 to cover the inner ends of inlet ports 11a, 12a and the entirety of horizontal grooves 11f, 12f and vertical grooves 11g, 12g and to partly cover the lower horizontal grooves 11e, 12e. Thus, horizontal inlet chambers R1a, R2a are formed along the lower edges of electrode plates 30 and communicated with the inlet ports 11a, 12a through each bifurcated passage formed by the horizontal grooves 11f, 12f and vertical grooves 11g, 12g, while horizontal outlet chambers R1b, R2b are formed along the upper edges of electrode plates 30 and communicated with the outlet ports 11b, 12b.

As shown in FIGS. 1, 2, 6 and 7, the guide assemblies 40 each are composed of a plurality of laterally equally spaced parallel vertical lattice members 41 made of an insulation resin material and a pair of parallel lateral frame members 42, 43 secured to the upper and lower ends of vertical lattice members 41. The guide assemblies 40 are coupled within the rectangular recesses 11d, 12d of casing plates 11, 12 in such a manner that the vertical lattice members 41 are placed to separate the diaphragm 20 from the electrode plates 30 and to linearly introduce the flow of water from the inlet chambers R1a, R2a into the outlet chambers R1b, R2b and that the lower lateral frame members 43 are associated with the electrode plates 30 to form restriction passages S for defining an amount of the water flowing from the inlet chambers R1a, R2a into the outlet chambers R1b, R2b. Each opening area of the restriction passages S can be varied by adjusting the mounting positions of the guide assemblies 40 in a vertical direction. For the purpose of adjusting the mounting position of the respective guide assemblies 40, there is provided a predetermined clearance between each threaded portion of the electrode terminal bolts 50 and the stepped holes 11c, 12c of casing plates 11, 12. It is preferable that each cross-section of the vertical lattice members 41 is triangle to be in surface contact with the diaphragm 20 and in line contact with the electrode plates 30. This is useful to expedite discharge of bubbles from the outlet ports 11b, 12b without causing any reduction of the effective area of the electrode plates 30.

In the electrolyzer, the guide assemblies 40 are attached to the electrode plates 30 as shown in FIG. 6 after the electrode plates 30 have been mounted within the casing plates 30 by means of the electrode terminal bolts 50. Thereafter, the casing plates 11 and 12 are united by means of the bolts 13 and nuts 15 in such a manner that the diaphragm 20 is placed between the guide assemblies 40.

In use of the electrolyzer, water to be treated is supplied into the horizontal inlet chambers R1a, R2a from the inlet ports 11a, 12a through the bifurcated passages formed by the horizontal grooves 11f, 12f and vertical grooves 11g, 12g. The water flows upward from the inlet chambers R1a, R2a into the outlet chambers R1b, R2b through the reaction chambers R1, R2 and is discharged from the outlet chambers R1b, R2b. Thus, the water is electrolyzed in the reaction chambers R1, R2 between the electrode plates 30. Since in this embodiment the electrode plates 30 are assembled with the casing plates 11, 12 in such a manner as to cover the entirety of the inner ends of inlet ports 11a, 12a and grooves 11f, 12f and 11g, 12g and to partly cover the lower horizontal grooves 11e, 12e, the water supplied into the inlet ports 11a, 12a flows into the horizontal inlet chambers R1a, R2a through the bifurcated passages along the lower edges of electrode plates 30. As a result, the flow of water into the horizontal inlet chambers R1a, R2a is uniformed in entirety. Thus, the flow of water from the inlet chambers R1a, R2a into the outlet chambers R1b, R2b is uniformed so that the water is electrolyzed by the electrode plates 30 at their whole width. Since the flow of water from the inlet chambers R1a, R2a into the outlet chambers R1b, R2b is caused in a vertical direction, bubbles of cases generated by electrolytic treatment are raised by the upward flow of water and accumulated in the outlet chambers R1b, R2b above the electrode plates 30. Thus, the bubbles of gases are smoothly discharged without adherence to the electrode plates 30. This is useful to enhance the treatment efficiency of the electrolyzer The addition, the flow of water from the inlet chambers R1a, R2a toward the outlet chambers R1b, R2b is linearly introduced by the vertical lattice members 41 disposed between the diaphragm 20 and the electrode plates 30. This is also useful to enhance the treatment efficiency of the electrolyzer. Since the diaphragm 20 is applied with the predetermined tension force by engagement of the casing plates 11 and 12 at their rectangular projection 11l and groove 12i, the space between the electrode plates 30 can be reduced without causing any contact with the diaphragm 20.

Although in the electrolyzer described above, the inlet ports 11a, 12a and outlet ports 11b, 12b have been provided at the central portions of casing plates 11 and 12, the inlet and outlet ports may be provided on a diagonal line as schematically illustrated In FIG. 8. In such a modification of the electrolyzer, the casing plates 11 and 12 are formed with L-letter shaped grooves 11e and 12e respectively communicated with the inlet ports 11a and 12a through bifurcated passages formed by grooves 11g and 12g. With the L-letter shaped grooves 11e and 12e, L-letter shaped inlet chambers R1a, R2a are formed along the lower edges and side edges of the electrode plates 30. In addition, the guide assemblies 40 each are constructed to diagonally introduce the flow of water from the inlet chambers R1a, R2a into the outlet ports 11b, 12b.

In actual practices of the present invention, the horizontal grooves 11h, 12h located at each upper portion of casing plates 11 and 12 may be eliminated, and the inlet ports 11a, 12a may be placed in direct communication with the lower horizontal grooves 11e, 12e without forming the upper horizontal grooves 11f, 12f and vertical grooves 11g, 12g.

what is claimed is:

1. An electrolyzer Including an upright casing made of an insulation resin material, the casing having a lower portion formed with a pair of opposed inlet ports and an upper portion formed with a pair of opposed outlet ports, an ion permeable diaphragm mounted within the casing to subdivide the interior of the casing into a pair of reaction chambers respectively in open communication with the inlet and outlet ports, a pair of electrode plates respectively disposed within the reaction chambers and opposed to one another through the diaphragm for electrolyzing water flowing therethrough from the inlet ports to the outlet ports when being applied with electric current, wherein said electrode plates are attached to internal surfaces of said casing to cover each inner end of said inlet ports and to form a pair of bifurcated passages respectively in open communication with said inlet ports, and wherein a pair of inlet chambers are formed along each lower edge of said electrode plates and communicated with said inlet ports through said bifurcated passages.

2. An electrolyzer as recited in claim 1, wherein said casing is composed of a pair of casing plates united at their outer peripheries through said diaphragm in a liquid-tight manner that said means for applying tension to diaphragm.

3. An electrolyzer as recited in claim 2, wherein said casing comprises a first casing section and a second casing section having corresponding first and second mating surfaces, wherein said means for applying tension includes an engagement groove on the first mating surface on the first casing section and an engagement projection, on said second mating surface on the second casing section said first and second surfaces sandwiching said diaphragm therebetween in a liquid-tight manner, and said engagement groove and said engagement projection engaging said diaphragm and pulling said diaphragm outwardly from a center of said casing.

4. An electrolyzer as recited in claim 1, wherein said casing comprises a first casing section and a second casing section having corresponding first and second mating surfaces, wherein the first mating surface on the first casing section includes an engagement groove and wherein said second mating surface on the second casing section includes an engagement projection, such that said first and second surfaces sandwich said diaphragm therebetween in a liquid-tight manner, and wherein said engagement groove and said engagement projection engage said diaphragm and pull said diaphragm outwardly from a center of said casing.

5. An electrolyzer including an upright casing having a lower portion formed with a pair of opposed inlet ports and an upper portion formed with a pair of opposed outlet ports, an ion permeable diaphragm mounted within the casing to subdivide the interior of the casing into a pair of reaction chambers respectively in open communication with the inlet and outlet ports, a pair of electrode plates respectively disposed within the reaction chambers and opposed to one another through the diaphragm for electrolyzing water flowing therethrough from the inlet ports to the outlet ports when being applied with electric current, wherein said electrode plates are attached to internal surfaces of said casing to cover each inner end of said inlet ports, wherein a pair of inlet chambers respectively in open communication with said inlet ports are formed along each lower edge of said electrode plates, and wherein a pair of outlet chambers respectively in open communication with said outlet ports are formed along each upper edge of said electrode plates.

6. An electrolyzer as recited in claim 5, wherein said casing comprises a first casing section and a second casing section having corresponding first and second mating surfaces, wherein the first mating surface on the first casing section includes an engagement groove and wherein said second mating surface on the second casing section includes an engagement projection, such that said first and second surfaces sandwich said diaphragm therebetween in a liquid-tight manner, and wherein said engagement groove and said engagement projection engage said diaphragm and pull said diaphragm outwardly from a center of said casing.

7. An electrolyzer as claimed in claim 5, wherein a pair of guide assemblies are disposed within said reaction chambers, said guide assemblies each including a plurality of laterally spaced vertical lattice members for linearly introducing the flow of water from said inlet chambers toward said outlet chambers.

8. An electrolyzer as recited in claim 7, wherein each cross-section of said vertical lattice members is triangle to be in surface contact with said diaphragm and in line contact with said electrode plates.

* * * * *

UNITED STATES PATENT AND TRADEMARK OFFICE
CERTIFICATE OF CORRECTION

PATENT NO. : 5,766,431
DATED : June 16, 1998
INVENTOR(S) : Tanaka et al.

It is certified that error appears in the above-identified patent and that said Letters Patent is hereby corrected as shown below:

On the title page,

Item [73], please delete "Hosizaki Denki Kabushiki Kaisha"

insert therefor -- Hoshizaki Denki Kabushiki Kaisha --

Signed and Sealed this

Fifteenth Day of September, 1998

Attest:

BRUCE LEHMAN

*Attesting Officer*         *Commissioner of Patents and Trademarks*